(12) United States Patent
Gao et al.

(10) Patent No.: US 8,527,651 B2
(45) Date of Patent: Sep. 3, 2013

(54) CONTENT IDENTIFICATION METHOD AND SYSTEM, AND SCIDM CLIENT AND SERVER

(75) Inventors: Hongtao Gao, Shenzhen (CN); Yijun Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 537 days.

(21) Appl. No.: 12/537,643

(22) Filed: Aug. 7, 2009

(65) Prior Publication Data

US 2009/0319639 A1   Dec. 24, 2009

Related U.S. Application Data

(63) Continuation of application No. PCT/CN2009/071626, filed on May 4, 2009.

(30) Foreign Application Priority Data

Jun. 19, 2008   (CN) .......................... 2008 1 0115249

(51) Int. Cl.
G06F 15/16   (2006.01)
(52) U.S. Cl.
USPC ............ 709/232; 709/230; 709/231; 709/219
(58) Field of Classification Search
USPC ....................................................... 709/219
See application file for complete search history.

(56) References Cited

U.S. PATENT DOCUMENTS

| 2002/0164047 | A1  | 11/2002 | Yuval |
| 2004/0059933 | A1* | 3/2004  | Levy ............................ 713/200 |
| 2004/0060060 | A1* | 3/2004  | Carr ................................ 725/31 |
| 2004/0073516 | A1* | 4/2004  | Yamamichi et al. ............ 705/57 |
| 2004/0215469 | A1  | 10/2004 | Fukushima et al. |
| 2006/0224448 | A1  | 10/2006 | Herf |
| 2006/0276174 | A1  | 12/2006 | Katz et al. |

(Continued)

FOREIGN PATENT DOCUMENTS

| CN | 1818964 A | 8/2006 |
| CN | 101072116 A | 11/2007 |

(Continued)

OTHER PUBLICATIONS

Written Opinion of the International Searching Authority (translation) dated (mailed) Aug. 13, 2009, issued in related Application No. PCT/CN2009/071626,filed May 4, 2009, Huawei Technologies Co., Ltd. (5 pgs.).

(Continued)

*Primary Examiner* — Kevin Bates
*Assistant Examiner* — Tom Y Chang
(74) *Attorney, Agent, or Firm* — Conley Rose, P.C.; Grant Rodolph; Nicholas K. Beaulieu

(57) ABSTRACT

A content identification method and system, and a secure content identification mechanism (SCIDM) client and server are provided. The content identification method includes: selecting an identification mechanism for a content to be identified; extracting identification information of the content to be identified corresponding to the selected identification mechanism; and sending a first content identification request, in which the first content identification request contains the selected identification mechanism and the identification information, and is adapted to request an SCIDM server to identify an attribute of the content to be identified by using the identification mechanism and according to the identification information. Thus, a load of a content identification system is reduced, and an efficiency of content identification is improved.

17 Claims, 6 Drawing Sheets

(56) References Cited

U.S. PATENT DOCUMENTS

| | | | |
|---|---|---|---|
| 2007/0208668 A1* | 9/2007 | Candelore | 705/57 |
| 2007/0271189 A1* | 11/2007 | Morten et al. | 705/57 |
| 2008/0066185 A1 | 3/2008 | Lester et al. | |
| 2008/0091799 A1 | 4/2008 | Weaver | |
| 2008/0214163 A1* | 9/2008 | Onyon et al. | 455/414.2 |
| 2008/0320596 A1* | 12/2008 | Wang et al. | 726/26 |
| 2009/0013174 A1* | 1/2009 | Foti et al. | 713/151 |
| 2009/0063629 A1* | 3/2009 | Jeong et al. | 709/203 |
| 2009/0150320 A1* | 6/2009 | Geppert | 706/47 |

FOREIGN PATENT DOCUMENTS

| | | |
|---|---|---|
| CN | 101176094 | 5/2008 |
| CN | 101176094 A | 5/2008 |
| WO | WO 01/97128 A1 | 12/2001 |
| WO | WO 02/101494 A2 | 12/2002 |

OTHER PUBLICATIONS

Extended European search report, pursuant to Rule 62 EPC, the supplementary European search report (Art. 153(7) EPC) and the European search opinion for Application No. 09765348.9, mailed May 18, 2011, Huawei Technologies C., Ltd (6 pgs.).

Secure Content Identification Mechanism Requirements, Draft V.1.0, dated Jun. 18, 2008, Open Mobile Alliance, OMA-RD-SCIDM-V1_0-20080618-D, [OMA-Template-Spec-20080101-1] (24 pgs.).

* cited by examiner

CONTENT IDENTIFICATION METHOD AND SYSTEM, AND SCIDM CLIENT AND SERVER

CROSS-REFERENCE TO RELATED APPLICATIONS

This application is a continuation of International Application No. PCT/CN2009/071626, filed on May 4, 2009, which claims priority to Chinese Patent Application No. 200810115249.1, filed on Jun. 19, 2008. The contents of the above identified applications are incorporated herein by reference in their entireties.

FIELD OF THE TECHNOLOGY

The present invention relates to the field of information security technology, and more particularly to a content identification method and system, and a secure content identification mechanism (SCIDM) client and server.

BACKGROUND

Spreading of contents that infringe copyright via networks is attracting more and more attention. Correct identification of the contents that infringe copyright is the basis for managing (for example, filtering or screening) the contents spread via networks.

A current secure content identification mechanism (SCIDM) is a content-based identification mechanism based on fingerprint extraction (referred to as a fingerprint-based identification mechanism in the following). An SCIDM-based content identification system manages an SCIDM server (also referred to as a Content Identification Manager (CIM)). A protected content is registered with the CIM, and the CIM extracts a fingerprint from the protected content and stores the fingerprint, and meanwhile, the CIM stores related attribute information (for example, copyright ownership information or a copyright protection rules) of the protected content. In addition, the SCIDM-based content identification system also defines an SCIDM client (also referred to as a Monitor Entity (ME)). The SCIDM client is adapted to monitor whether a content passing through or sent to an entity such as a monitor gateway, a user terminal or a content sharing website infringes copyright. During the monitoring process, the SCIDM client extracts a fingerprint from the received content, and sends the extracted fingerprint to the SCIDM server; and the SCIDM server locally searches for a fingerprint of a protected content matching the extracted fingerprint. If the SCIDM server finds the fingerprint of the protected content matching the extracted fingerprint, the SCIDM server returns related content attributes to the SCIDM client, and the SCIDM client manages (for example, filters or screens) corresponding contents according to the content attributes.

In the implementation of the present invention, the inventor found that in the existing fingerprint-based identification mechanism, as the SCIDM client extracts the fingerprint of the content and the SCIDM server performs content identification operations (such as searching and matching operations) according to the fingerprint of the content, a lot of computing resources are consumed. As a great number of audio and video contents exist in the network, a heavy load is imposed on the SCIDM client and the SCIDM server, resulting in a reduction in the identification efficiency.

SUMMARY

Accordingly, embodiments of the present invention are directed to a content identification method and system, and a secure content identification mechanism (SCIDM) client and server, which reduce load of the content identification system and improve the identification efficiency.

In a first aspect, the embodiments of present invention provide a content identification method. The content identification method includes the following steps.

selecting an identification mechanism for a content to be identified;

extracting identification information of the content to be identified corresponding to the selected identification mechanism; and sending a first content identification request, in which the first content identification request contains the selected identification mechanism and the identification information for requesting a secure content identification mechanism (SCIDM) server to identify an attribute of the content to be identified by using the identification mechanism and according to the identification information.

In the content identification method provided in the first aspect of the embodiments of the present invention, the identification mechanism is selected for the content to be identified, the identification information required for the content identification by using the selected identification mechanism is extracted from the content to be identified, and the first content identification request containing the identification mechanism and the identification information is sent to the SCIDM server for instructing the SCIDM server to use the identification mechanism contained in the first content identification request and identify the attribute of the content to be identified according to the identification information contained in the first content identification request. Thus, the content identification mechanism can be flexibly selected according to a load condition of a content identification system or actual security requirements, the load of the content identification system is reduced, and the efficiency of content identification is improved.

In a second aspect, the embodiments of the present invention provide another content identification method. The content identification method includes the following steps acquiring an identification mechanism and identification information corresponding to the identification mechanism contained in a first content identification request received from a secure content identification mechanism (SCIDM) client; and identifying an attribute of a content to be identified by using the identification mechanism and according to the identification information and prestored content data information.

In the content identification method provided in the second aspect of the embodiments of the present invention, the first content identification request sent by the SCIDM client is received, the identification mechanism contained in the first content identification request is used, and the attribute of the content to be identified is identified according to the identification information contained in the first content identification request. Thus, the identification mechanism and identification information selected by the SCIDM client can be respectively used as the identification mechanism and identification information for identifying the content to be identified. As such, the SCIDM client can flexibly select the content identification mechanism according to a load condition of a content identification system or actual security requirements, the load of the content identification system is reduced, and the efficiency of content identification is improved.

In a third aspect, the embodiments of the present invention provide an SCIDM client. The SCIDM client includes:

a selecting module, adapted to select an identification mechanism for a content to be identified;

an extracting module, adapted to extract identification information of the content to be identified corresponding to the selected identification mechanism; and a sending module, adapted to send a first content identification request, in which the first content identification request contains the selected identification mechanism and the identification information for requesting an SCIDM server to identify an attribute of the content to be identified by using the identification mechanism and according to the identification information.

In the SCIDM client provided in the third aspect of the embodiments of the present invention, the selecting module selects the identification mechanism for the content to be identified, the extracting module extracts the identification information required for the content identification by using the selected identification mechanism from the content to be identified, and the sending module sends the first content identification request containing the identification mechanism and the identification information to the SCIDM server for instructing the SCIDM server to use the identification mechanism contained in the first content identification request and identify the attribute of the content to be identified according to the identification information contained in the first content identification request. Thus, the SCIDM client can flexibly select the content identification mechanism according to a load condition of a content identification system or actual security requirements, the load of the content identification system is reduced, and the efficiency of content identification is improved.

In a fourth aspect, the embodiments of the present invention provide an SCIDM server. The SCIDM server includes:

an acquiring module, adapted to acquire an identification mechanism and identification information corresponding to the identification mechanism contained in a first content identification request received from an SCIDM client; and an identifying module, adapted to identify an attribute of a content to be identified by using the identification mechanism and according to the identification information and prestored content data information.

In the SCIDM server provided in the fourth aspect of the embodiments of the present invention, the acquiring module acquires the identification mechanism and identification information contained in the first content identification request sent by the SCIDM client, and the identifying module uses the acquired identification mechanism and identification information to identify the attribute of the content to be identified. Thus, the identification mechanism and identification information selected by the SCIDM client can be respectively used by the identifying module as the identification mechanism and identification information for identifying the content to be identified. As such, the SCIDM client can flexibly select the content identification mechanism according to a load condition of a content identification system or actual security requirements, the load of the content identification system can be reduced, and the efficiency of content identification is improved.

In a fifth aspect, the embodiments of the present invention provide a content identification system. The content identification system includes:

a secure content identification mechanism (SCIDM) client, adapted to select an identification mechanism for a content to be identified, extract identification information of the content to be identified corresponding to the selected identification mechanism, and send a first content identification request, in which the first content identification request contains the selected identification mechanism and the identification information; and an SCIDM server, adapted to receive the first content identification request sent by the SCIDM client, and acquire the identification mechanism and the identification information corresponding to the identification mechanism contained in the first content identification request, and identify an attribute of the content to be identified by using the identification mechanism and according to the identification information and prestored content data information.

In the content identification system provided in the fifth aspect of the embodiments of the present invention, the SCIDM client selects the identification mechanism for the content to be identified, extracts the identification information required for the content identification using the selected identification mechanism from the content to be identified, and sends the first content identification request containing the identification mechanism and the identification information to the SCIDM server; and the SCIDM server uses the identification mechanism contained in the first content identification request and identifies the attribute of the content to be identified according to the identification information contained in the first content identification request. Thus, the SCIDM client can flexibly select the content identification mechanism according to a load condition of a content identification system or actual security requirements, the load of the content identification system is reduced, and the efficiency of content identification is improved.

DETAILED DESCRIPTION

The technical solutions of the present invention are described in more detail below with reference to the embodiments and the accompanying drawings.

Figure 1:
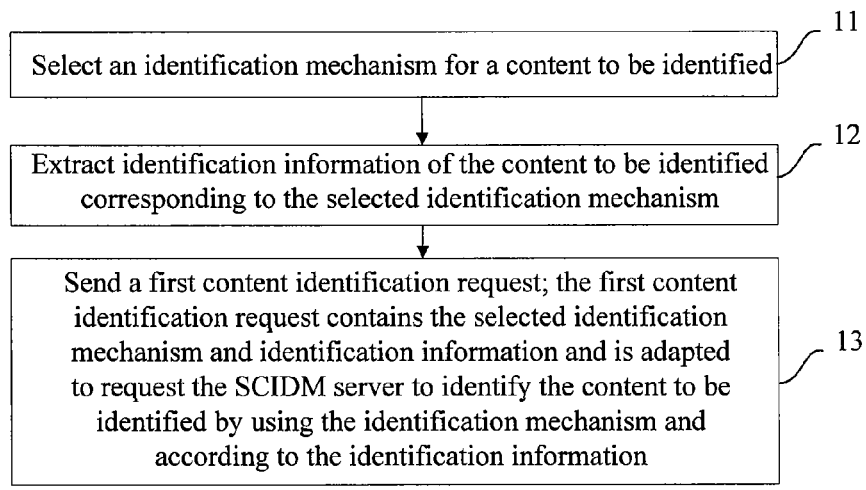
FIG. 1 is a flow chart of a first embodiment of a content identification method according to the present invention.

FIG. 1 is a flow chart of a first embodiment of a content identification method according to the present invention. Referring to FIG. 1, this embodiment includes the following steps.

In Step 11, an SCIDM client selects an identification mechanism for a content to be identified.

The SCIDM client can monitor a content passing through or sent to an entity such as a monitor gateway, a user terminal or a content sharing website, and identify the content passing through or sent to the entity such as the monitor gateway, the user terminal or the content sharing website according to actual requirements during the monitoring process. When the SCIDM client initiates a content identification process on the content to be identified, the SCIDM client can select a content identification mechanism according to a load condition of a content identification system, a specific application scenario, or preset security requirements.

The content identification mechanisms selected by the SCIDM client may include: a content ID-based identification mechanism, a tampering history-based identification mechanism, a content metadata-based identification mechanism, a watermark-based identification mechanism, or a fingerprint-based identification mechanism. For the five content identification mechanisms, the complexity increases gradually from simple to complex, but the robustness and security of content identification increase gradually from low to high. In other words, the simpler the identification mechanism is, the lower the reliability may be, while the more complex the identification mechanism is, the higher the reliability may be. For example, in order to prevent a content from being identified by the SCIDM client, an ID and name of the content are the most likely to be tampered. Metadata is generally embedded in a file header, and can be read or written only with a special tool, so it is difficult to modify the content by modifying the metadata. A digital watermark is randomly embedded into some bits of the content, and the embedding position information is confidential, which can hardly be obtained by ordinary, so it is also difficult to modify the content by damaging the digital watermark. In a fingerprint extraction method, a key fingerprint is directly extracted from the content and then compared with a protected content fingerprint, so the content fingerprint-based identification mechanism becomes invalid only when the key fingerprint of the content is damaged; however, after the key fingerprint of the content is changed, the content is likely to have been revised or significantly tampered. If the content has been revised as compared with the protected content, in other words, the content has been recreated; the content will no longer infringe the copyright of the protected content. Once the content is seriously damaged, the user experience is degraded when the user views the content, so the damage to the content is often meaningless. Therefore, the fingerprint-based identification mechanism has the highest reliability and security for content identification.

In the implementation of the present invention, the inventor found that the probability of correctly identifying an attribute of the content by using a simple content identification mechanism (for example, the content ID-based identification mechanism) is still high, because in actual applications, most users do not change the name and content ID of the content, less likely to change the metadata, and even less likely to damage the digital watermark. Therefore, the difference between the present invention and the prior art lies in that: the content identification does not always need to use a complex identification mechanism (for example, the fingerprint-based identification mechanism); instead, the content identification mechanism may be flexibly selected for content identification according to a load condition of a content identification system, a specific application scenario, or preset security requirements. In order to achieve a high efficiency of content identification in actual applications, the SCIDM client flexibly selects a content identification mechanism according to the load condition of the content identification system, the specific application scenario, or the preset security requirements. For example, for application scenarios that the content identification system is under a low load, security requirements are low, or a low level of security requirements is preset, a simple content identification mechanism may be selected (for example, the content ID-based identification mechanism or tampering history-based identification mechanism), thus reducing the system load and saving the system resources while ensuring the content security. For application scenarios that the content identification system is under a high load, security requirements are high, or a high level of security requirements is preset, a complex content identification mechanism may be selected (for example, the fingerprint-based identification mechanism), thus effectively ensuring the reliability and security of content identification.

In Step 12, the SCIDM client extracts identification information of the content to be identified corresponding to the selected identification mechanism.

After the SCIDM client selects the identification mechanism for the content to be identified, the SCIDM client extracts identification information of the content to be identified corresponding to the selected identification mechanism. The identification information extracted by the SCIDM client from the content to be identified may include a content ID, content size information, content source address information, content destination address information, metadata, a digital watermark, or a content fingerprint of the content to be identified. Specifically, the content ID may be a name of the content to be identified, or a unique ID assigned by an SCIDM server to the registered content. When the identification mechanism selected by the SCIDM client is the content ID-based identification mechanism, the identification information extracted by the SCIDM client includes the content ID and first auxiliary identification information of the content to be identified, and the first auxiliary identification information includes, but is not limited to, the content size information. When the identification mechanism selected by the SCIDM client is the tampering history-based identification mechanism, the identification information extracted by the SCIDM client includes the content ID and second auxiliary identification information of the content to be identified, and the second auxiliary identification information may include the content source address information, the content destination address information, or other auxiliary identification information; in which the content source address information is a network address or network ID of an entity that sends the content, and the content destination address information is a network address or network ID of an entity that the content is sent to. When the identification mechanism selected by the SCIDM client is the watermark-based identification mechanism, the identification information extracted by the SCIDM client includes the digital watermark of the content to be identified. When the identification mechanism selected by the SCIDM client is the fingerprint-based identification mechanism, the identification information extracted by the SCIDM client includes the content fingerprint of the content to be identified.

Moreover, when the SCIDM client sends a content identification request to the SCIDM server, the SCIDM client may also select a plurality of identification mechanisms, for example, select a plurality of identification mechanisms except the most complex identification mechanism and extract identification information required by each identification mechanism respectively. The SCIDM server may use corresponding identification mechanisms in turn according to an execution order of the identification mechanisms in terms of complexity. If all of the selected identification mechanisms have been used but the content identification fails, the SCIDM client may also select the most complex identification mechanism to initiate a content identification process again.

In Step 13, the SCIDM client sends a first content identification request to the SCIDM server, in which the first content identification request contains the selected identification mechanism and the identification information corresponding to the selected identification mechanism, and is adapted to request the SCIDM server to identify an attribute of the content to be identified by using the identification mechanism and according to the identification information.

In this embodiment, the identification mechanism is selected for the content to be identified, the identification information required for the content identification by using the selected identification mechanism is extracted from the content to be identified, and the first content identification request containing the identification mechanism and the identification information is sent to the SCIDM server for instructing the SCIDM server to use the identification mechanism contained in the first content identification request and identify the attribute of the content to be identified according to the identification information contained in the first content identification request. Thus, the content identification mechanism may be flexibly selected according to a load condition of a content identification system, a specific application scenario, or actual security requirements, the load of a content identification system is reduced, and the efficiency of content identification is improved.

On the basis of the technical solution according to this embodiment, a content database may be set in the SCIDM server, and content data information may be stored in the content database. The content data information stored in the content database of the SCIDM server may include actual attribute information, tampering records, actual watermark information, actual metadata, protected content fingerprints of the content, or other content data information. The actual attribute information includes actual content IDs, actual content size information, and the like; and an actual content ID may be an actual name of a registered content, or a unique ID assigned by the SCIDM server to the registered content. The tampering records include tampered content IDs, content identification time information, content source address information, content destination address information, and the like; and a tampered content ID may be a tampered name of a registered content, or an ID tampered by the SCIDM server for the registered content. When the SCIDM server acquires the identification mechanism selected by the SCIDM client, the SCIDM server may use the identification mechanism selected by the SCIDM client, and identify the attribute of the corresponding content according to the identification information extracted by the SCIDM client and the content data information prestored in the content database. If the SCIDM server successfully identifies the content and sends the attribute information of the content to be identified to the SCIDM client, the SCIDM client may perform necessary processing on the corresponding content according to the acquired attribute information of the content, for example, manage (for example, filter or screen) the corresponding content.

Figure 2:
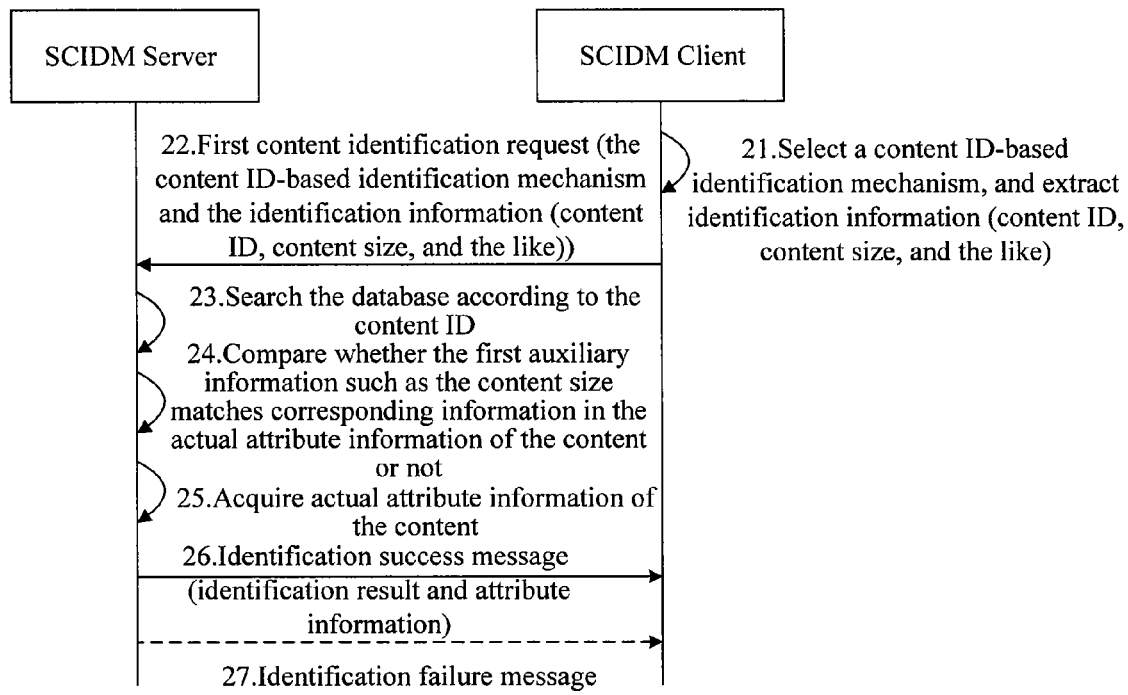
FIG. 2 is a flow chart of a second embodiment of the content identification method according to the present invention.

FIG. 2 is a flow chart of a second embodiment of the content identification method according to the present invention. In this embodiment, an attribute of a content to be identified is identified by using a simple content identification mechanism (content ID-based identification mechanism). Referring to FIG. 2, this embodiment includes the following steps.

In Step 21, an SCIDM client selects a content ID-based identification mechanism as an identification mechanism for a content to be identified according to a load condition of a content identification system or preset security requirements, and extracts identification information corresponding to the content ID-based identification mechanism, in other words, extracts identification information required for the content identification by using the content ID-based identification mechanism. The identification information may include a content ID and first auxiliary identification information of the content to be identified, and the first auxiliary identification information may include content size information and the like.

In Step 22, the SCIDM client sends a first content identification request to an SCIDM server. The first content identification request contains the identification mechanism (content ID-based identification mechanism) selected by the SCIDM client and the identification information (content ID, content name, content size information, and the like) corresponding to the identification mechanism (content ID-based identification mechanism) for instructing the SCIDM server to identify an attribute of the content to be identified by using the identification mechanism and according to the identification information.

In Step 23, the SCIDM server receives the first content identification request sent by the SCIDM client, queries whether an actual content ID identical to the content ID exists in actual attribute information of the content stored in the SCIDM server or not according to the content ID in the identification information; if the actual content ID identical to the content ID exists in actual attribute information of the content stored in the SCIDM server, the process proceeds to Step 24; otherwise, the process proceeds to Step 27. The actual attribute information of the content stored in the SCIDM server may include actual content IDs, actual content names, actual content size information, and the like.

In Step 24, the SCIDM server queries whether the first auxiliary identification information (the content size information and the like) in the identification information matches corresponding information stored in the SCIDM server, for example, the SCIDM server compares whether the content size information contained in the identification information matches the stored actual content size information or not; if the content size information contained in the identification information matches the stored actual content size information, the process proceeds to Step 25; otherwise, the process proceeds to Step 27.

In Step 25, the SCIDM server successfully identifies the content, and acquires corresponding actual attribute information of the content.

In Step 26, the SCIDM server sends an identification success message to the SCIDM client, and the identification success message contains an identification result and attribute information of the content to be identified; and the process ends.

In Step 27, the SCIDM server sends a content identification failure message to the SCIDM client; and the process ends.

In this embodiment, the content ID-based identification mechanism is selected as an identification mechanism for the content to be identified according to the load condition of the content identification system or preset security requirements (for example, the content identification system is under a high load, or a low level of security requirements is preset), and the SCIDM server identifies the attribute of the content to be identified according to the content ID-based identification mechanism, which significantly reduces the load of the content identification system and improves the efficiency of content identification. This embodiment is applicable to scenarios where the security identification requirements are not high.

Figure 3:
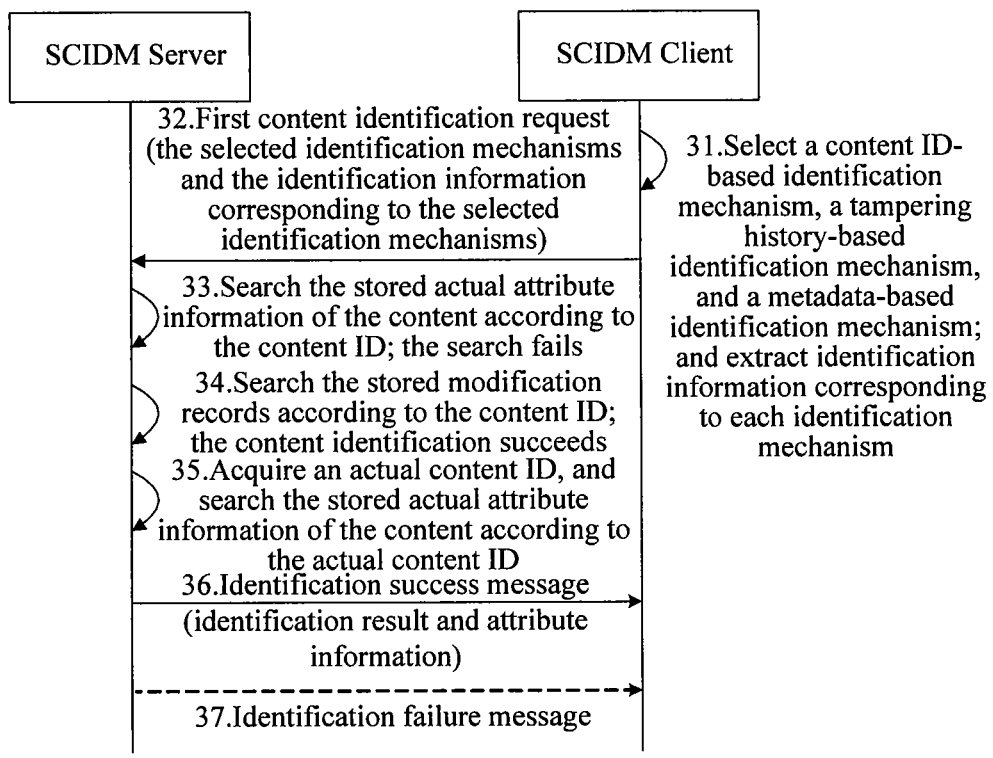
FIG. 3 is a flow chart of a third embodiment of the content identification method according to the present invention.

FIG. 3 is a flow chart of a third embodiment of the content identification method according to the present invention. In this embodiment, an SCIDM client selects a plurality of (for example, three) identification mechanisms for a content to be identified, and an SCIDM server identifies an attribute of the content to be identified by using the identification mechanisms selected by the SCIDM client in turn according to a preset execution order. Referring to FIG. 3, this embodiment includes the following steps.

In Step 31, the SCIDM client selects identification mechanisms for a content to be identified according to a load condition of a content identification system or preset security requirements, in which the identification mechanisms selected for the content to be identified include a content ID-based identification mechanism, a tampering history-based identification mechanism, and a content metadata-based identification mechanism. Further, the SCIDM client extracts identification information corresponding to each identification mechanism respectively, in other words, for the content ID-based identification mechanism, the identification information extracted by the SCIDM client corresponding to the content ID-based identification mechanism includes a content ID and first auxiliary identification information of the content to be identified, and the first auxiliary identification information may include content size information; for the tampering history-based identification mechanism, the identification information extracted by the SCIDM client corresponding to the tampering history-based identification mechanism includes the content ID and second auxiliary identification information, and the second auxiliary identification information may include content source address information and content destination address information; and for the content metadata-based identification mechanism, the identification information extracted by the SCIDM client corresponding to the content metadata-based identification mechanism includes metadata of the content to be identified, and here, the metadata mainly refers to a content-based hash, that is, the content is digested by using a Message-Digest Algorithm 5 (MD5) or SHA algorithm.

In Step 32, the SCIDM client sends a first content identification request to the SCIDM server. The first content identification request contains the identification mechanisms (content ID-based identification mechanism, tampering history-based identification mechanism, and content metadata-based identification mechanism) selected by the SCIDM client and the identification information corresponding to each of the identification mechanisms.

In Step 33, the SCIDM server receives the first content identification request, and the SCIDM server identifies an attribute of the content to be identified by using corresponding identification mechanisms in turn according to a preset execution order from simple to complex identification mechanisms. In other words, the SCIDM server firstly uses the content ID-based identification mechanism and the identification information corresponding to the content ID-based identification mechanism to identify the content: queries whether an actual content ID identical to the content ID exists in actual attribute information stored in the SCIDM server or not according to the content ID in the identification information; if the actual content ID identical to the content ID exists in actual attribute information stored in the SCIDM server, the identification of the content by using the content ID-based identification mechanism succeeds, and the process proceeds to Step 36; otherwise, the identification of the content by using the content ID-based identification mechanism fails, and the process proceeds to Step 34. The actual attribute information of the content stored in the SCIDM server may include actual content ID, actual content name, actual content size information, and the like.

In Step 34, the SCIDM server uses the tampering history-based identification mechanism, and queries whether a tampered content ID matching the content ID exists in tampering records stored in the SCIDM server or not according to the identification information (content ID, content source address information, or content destination address information) corresponding to the tampering history-based identification mechanism; if the tampered content ID matching the content ID exists in tampering records stored in the SCIDM server, the SCIDM server further queries whether corresponding information matching the content source address information or content destination address information contained in the identification information exists in the tampering records stored in the SCIDM server or not; and if content source address information or content destination address information matching the content source address information or content destination address information contained in the identification information exists in the tampering records stored in the SCIDM server, an actual content ID stored in the SCIDM server corresponding to the tampered content ID is acquired. At this time, as the identification of the content by using the tampering history-based identification mechanism succeeds, the SCIDM server does not require to use the content metadata-based identification mechanism to identify the content, and the process proceeds to Step 35. If no tampered content ID matching the content ID exists in the tampering records stored in the SCIDM server, or no content source address information or content destination address information matching the content source address information or content destination address information contained in the identification information exists in the tampering records stored in the SCIDM server, the SCIDM server uses the content metadata-based identification mechanism, and identifies the content to be identified according to the identification information (the content-based hash) corresponding to the content metadata-based identification mechanism (not shown in FIG. 3). The tampering records stored in the SCIDM server may include a tampered content ID, content identification time information, content source address information, content destination address information, and the like.

In Step 35, the SCIDM server acquires the actual content ID according to the tampered content ID, and queries actual attribute information stored in the SCIDM server according to the actual content ID.

In Step 36, the SCIDM server sends an identification success message to the SCIDM client, and the identification success message contains an identification result and attribute information of the content to be identified; and the process ends.

In Step 37, the SCIDM server sends a content identification failure message to the SCIDM client; and the process ends.

In this embodiment, the SCIDM client may select a plurality of identification mechanisms for the content to be identified according to the load condition of the content identification system or preset security requirements, and the SCIDM server uses corresponding identification mechanisms in turn according to a preset order or rule (for example, an execution order from simple to complex identification mechanisms), and identifies the content according to the identification information corresponding to the currently used content identification mechanism. When the SCIDM server successfully identifies the attribute of the content to be identified by using a simple content identification mechanism, the SCIDM server may not use complex content identification mechanisms selected by the SCIDM client (for example, although the SCIDM client selects a plurality of identification mechanisms including the tampering history-based identification mechanism and the content metadata-based identification mechanism, if the SCIDM server successfully identifies the content by using the tampering history-based identification mechanism, the SCIDM server no longer requires to use the content metadata-based identification mechanism to identify the content). Thus, the load of the content identification system is reduced, and the efficiency of content identification is improved.

Figure 4:
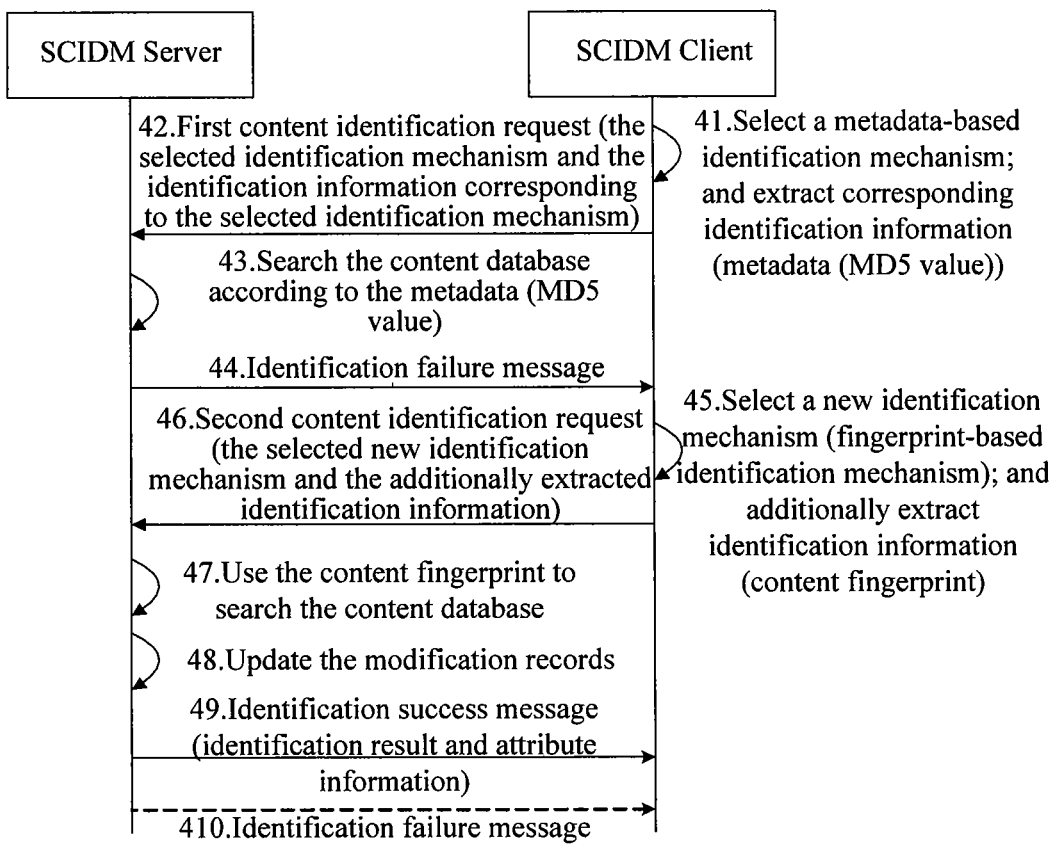
FIG. 4 is a flow chart of a fourth embodiment of the content identification method according to the present invention.

FIG. 4 is a flow chart of a fourth embodiment of the content identification method according to the present invention. In this embodiment, after the SCIDM server fails to identify the content according to the identification mechanisms selected by the SCIDM client and the identification information, the SCIDM server may send correct identification instruction information to the SCIDM client for instructing the SCIDM client to additionally provide a content fingerprint corresponding to the content to be identified. Or, when the SCIDM client receives an identification failure message sent by the SCIDM server and the identification mechanism previously selected by the SCIDM client is not the fingerprint-based identification mechanism, the SCIDM client selects a new identification mechanism. Referring to FIG. 4, this embodiment includes the following steps.

In Step 41, the SCIDM client selects a content metadata-based identification mechanism as an identification mechanism for a content to be identified according to a load condition of a content identification system or preset security requirements, and extracts identification information corresponding to the content metadata-based identification mechanism. The identification information includes metadata (an MD5 value), a content ID of the content to be identified, a content name of the content to be identified, and the like.

In Step 42, the SCIDM client sends a first content identification request to the SCIDM server. The first content identification request contains the content metadata-based identification mechanism selected by the SCIDM client and the identification information corresponding to the content metadata-based identification mechanism.

In Step 43, the SCIDM server searches content data stored in the SCIDM server according to the metadata (MD5 value), and if actual metadata matching the metadata (MD5 value) exists in the content data stored in the SCIDM server, it indicates that the SCIDM server successfully identifies the content, and the process proceeds to Step 49; otherwise, the process proceeds to Step 44.

In Step 44, the SCIDM server sends an identification failure message to the SCIDM client, and returns an identification result.

When the SCIDM server sends the identification failure message to the SCIDM client, the SCIDM server may further carry correct identification instruction information in the identification failure message, and the correct identification instruction information is used to instruct the SCIDM client to additionally provide identification information of the content to be identified. It should be understood that, the SCIDM server may also send the correct identification instruction information to the SCIDM client as a separate message.

In Step 45, when the SCIDM client receives the identification failure message sent by the SCIDM server, the SCIDM client actively selects the fingerprint-based identification mechanism as an identification mechanism for the content to be identified, and extracts identification information corresponding to the fingerprint-based identification mechanism, in other words, extracts a fingerprint of the content to be identified.

If the SCIDM server carries the correct identification instruction information in the identification failure message sent to the SCIDM client, or the SCIDM server sends the correct identification instruction information to the SCIDM client as a separate message, the SCIDM client selects the fingerprint-based identification mechanism as an identification mechanism for the content to be identified according to the received correct identification instruction information, and extracts the identification information corresponding to the fingerprint-based identification mechanism, in other words, extracts the fingerprint of the content to be identified.

In Step 46, the SCIDM client sends a second content identification request to the SCIDM server. The second content identification request contains a new identification mechanism (the fingerprint-based identification mechanism) and additionally extracted identification information (the fingerprint of the content to be identified).

In Step 47, the SCIDM server receives the second content identification request, uses the content fingerprint to search whether a protected content fingerprint matching the content fingerprint of the content to be identified exists in protected content fingerprints stored in the SCIDM server, and if the protected content fingerprint matching the content fingerprint of the content to be identified exists in protected content fingerprints stored in the SCIDM server, the content identification succeeds, and the process proceeds to Step 48; otherwise, the content identification fails, and the process proceeds to Step 410.

In Step 48, the SCIDM server updates tampering records. Information recorded in the tampering records includes actual content IDs, various tampered IDs, dates of identification records, and source addresses and destination addresses of identification records.

In Step 49, the SCIDM server sends an identification success message to the SCIDM client, and the identification success message contains an identification result and attribute information of the content to be identified; and the process ends.

In Step 410, the SCIDM server sends a content identification failure message to the SCIDM client; and the process ends.

In this embodiment, when the SCIDM client selects a simple identification mechanism (for example, the metadata-based identification mechanism) to request the SCIDM server to identify the content to be identified, if the SCIDM server fails to identify the content, the SCIDM server sends correct identification instruction information for instructing the SCIDM client to select a complex identification mechanism (for example, the fingerprint-based identification mechanism) and additionally provide required identification information; or, when receiving the identification failure message sent by the SCIDM server, the SCIDM client may also actively select a complex identification mechanism (for example, the fingerprint-based identification mechanism) and additionally provide the required identification information, so that the content identification mechanism becomes more reliable. Moreover, as the tampering records of the content data stored in the SCIDM server are updated after the SCIDM server successfully identifies the content, the SCIDM client may preferentially select the tampering history-based identification mechanism when selecting an identification mechanism for the same content. Thus, the load of the content identification system is reduced, and the efficiency of content identification is improved.

Figure 5:
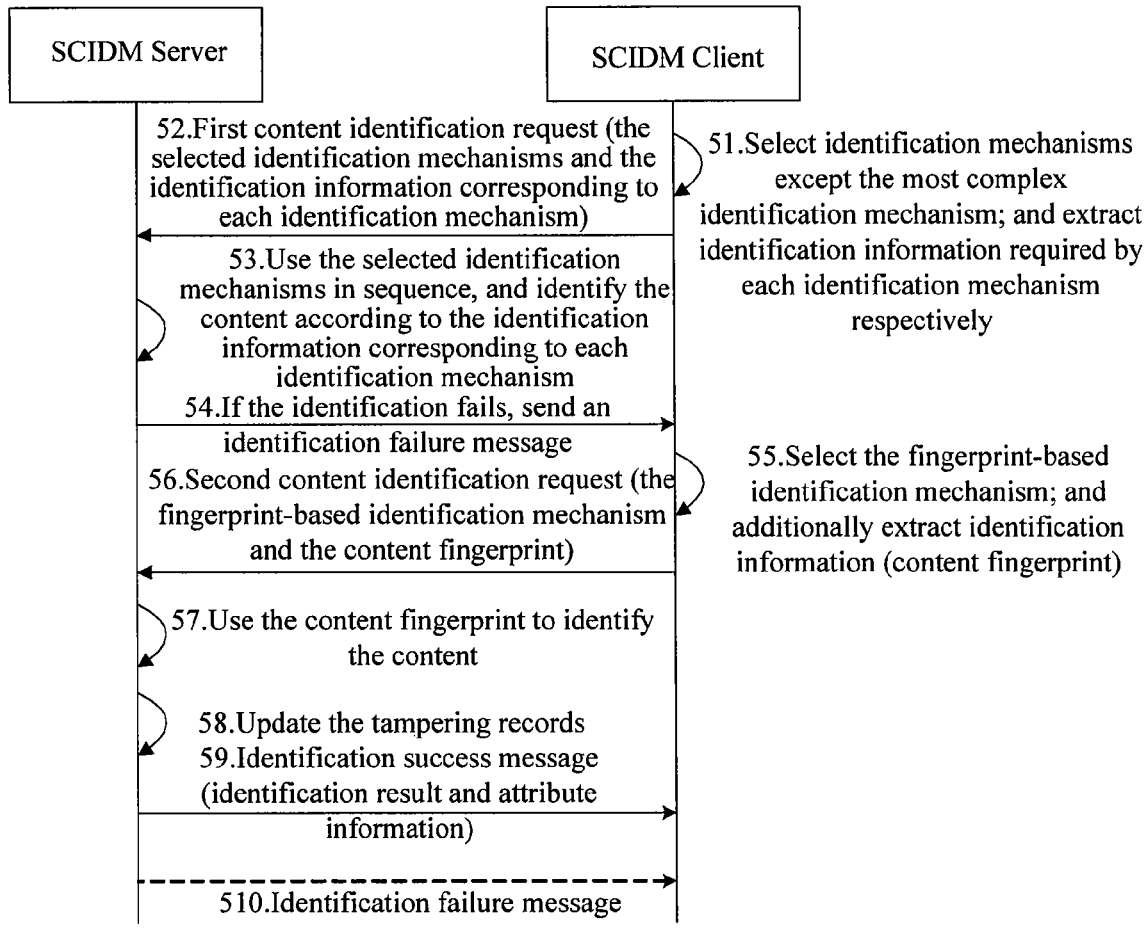
FIG. 5 is a flow chart of a fifth embodiment of the content identification method according to the present invention.

FIG. 5 is a flow chart of a fifth embodiment of the content identification method according to the present invention. In this embodiment, the SCIDM client selects a plurality of identification mechanisms except the most complex identification mechanism, and the SCIDM server uses corresponding identification mechanisms in turn according to an execution order of the identification mechanisms in terms of complexity. If all of the selected identification mechanisms have been used but the content identification still fails, the SCIDM client may select the most complex identification mechanism to initiate a content identification process again. Referring to FIG. 5, this embodiment includes the following steps.

In Step 51, the SCIDM client selects one or more identification mechanisms except the most complex (or the highest-level) identification mechanism, and extracts identification information required by each of the selected identification mechanisms respectively. For example, the most complex (or the highest-level) identification mechanism is the fingerprint-based identification mechanism, and other identification mechanisms that the SCIDM client supports include the content ID-based identification mechanism, the tampering history-based identification mechanism, the metadata-based identification mechanism, and the watermark-based identification mechanism. Accordingly, for the content ID-based identification mechanism, the identification information extracted by the SCIDM client includes a content ID and content size information of the content to be identified; for the tampering history-based identification mechanism, the identification information extracted by the SCIDM client includes the content ID of the content to be identified; for the watermark-based identification mechanism, the identification information extracted by the SCIDM client includes a digital watermark of the content to be identified; and for the fingerprint-based identification mechanism, the identification information extracted by the SCIDM client includes a content fingerprint of the content to be identified.

In Step 52, the SCIDM client sends a first content identification request to an SCIDM server. The first content identification request contains the one or more identification mechanisms selected by the SCIDM client and the identification information corresponding to each of the selected identification mechanisms.

In Step 53, the SCIDM server identifies an attribute of the content to be identified by using corresponding identification mechanisms in turn according to a preset execution order from simple to complex identification mechanisms. In other words, the SCIDM server uses the content ID-based identification mechanism, the tampering history-based identification mechanism, the metadata-based identification mechanism, and the watermark-based identification mechanism in sequence. When the SCIDM server fails to identify the content to be identified by using the selected identification mechanisms, the process proceeds to Step 55.

If the SCIDM server fails to identify the content to be identified by using the content ID-based identification mechanism, the SCIDM server may use the tampering history-based identification mechanism; and if the SCIDM server fails to identify the content to be identified by using the tampering history-based identification mechanism, the SCIDM server may use the metadata-based identification mechanism. For detailed descriptions with respect to the processes that the SCIDM server identifies the attribute of the content to be identified by using the content ID-based identification mechanism, the tampering history-based identification mechanism and the metadata-based identification mechanism, reference may be made to the first to fourth embodiments of the content identification method according to the present invention, and the details will not be described again here. If the SCIDM server fails to identify the content to be identified by using the metadata-based identification mechanism, the SCIDM server may use the watermark-based identification mechanism. The watermark-based identification mechanism requires the SCIDM client to negotiate with the SCIDM server on watermark-related information in advance, including a watermark embedding and extraction algorithm, watermark embedding position information, and other information. In order to prevent the SCIDM client from revealing the watermark-related information, the watermark-based identification mechanism is applicable to scenarios where the SCIDM client is located at a monitor gateway, website, or SP. The SCIDM client extracts digital watermark information contained in the content in Step 51, and sends the digital watermark information to the SCIDM server in Step 52. If the SCIDM client fails to extract the watermark information in Step 51 because the watermark is damaged, the SCIDM server cannot use the watermark-based identification mechanism for identification. If the SCIDM client successfully extracts the watermark information and sends the watermark information to the SCIDM server, the SCIDM server searches whether a watermark matching the extracted watermark information is stored in a content database or not according to the watermark information; if the watermark matching the extracted watermark information is stored in a content database, the content identification succeeds; otherwise, the content identification fails. FIG. 5 merely shows the situation that the SCIDM server fails to identify the content to be identified by using the content ID-based identification mechanism, the tampering history-based identification mechanism, the metadata-based identification mechanism, and the watermark-based identification mechanism.

In Step 54, the SCIDM server sends an identification failure message to the SCIDM client and returns an identification result, and the process proceeds to Step 55.

In Step 55, when the SCIDM client receives the identification failure message sent by the SCIDM server, the SCIDM client selects the fingerprint-based identification mechanism as an identification mechanism for the content to be identified, and extracts identification information corresponding to the fingerprint-based identification mechanism, in other words, extracts a fingerprint of the content to be identified.

In Step 56, the SCIDM client sends a second content identification request to the SCIDM server. The second content identification request contains a new identification mechanism (the fingerprint-based identification mechanism) and additionally extracted identification information (the fingerprint of the content to be identified).

In Step 57, the SCIDM server receives the second content identification request, uses the content fingerprint to search whether a protected content fingerprint matching the content fingerprint of the content to be identified exists in protected content fingerprints stored in the SCIDM server, and if the protected content fingerprint matching the content fingerprint of the content to be identified exists in protected content fingerprints stored in the SCIDM server, the content identification succeeds, and the process proceeds to Step 58; otherwise, the content identification fails, and the process proceeds to Step 510.

In Step 58, the SCIDM server updates tampering records. Information recorded in the tampering records includes actual content IDs, various tampered IDs, dates of identification records, and source addresses and destination addresses of identification records.

In Step 59, the SCIDM server sends an identification success message to the SCIDM client, and the identification success message contains an identification result and attribute information of the content to be identified; and the process ends.

In Step 510, the SCIDM server sends a content identification failure message to the SCIDM client; and the process ends.

In this embodiment, when the SCIDM client selects a plurality of simple identification mechanisms (for example, the content ID-based identification mechanism, the tampering history-based identification mechanism, the metadata-based identification mechanism, and the watermark-based identification mechanism) to request the SCIDM server to identify the content to be identified, if the SCIDM server fails to identify the content to be identified by using the identification mechanisms in sequence, the SCIDM client may select a complex identification mechanism (for example, the fingerprint-based identification mechanism) and additionally provide the content fingerprint, and initiates a content identification process again, so that the content identification mechanism becomes more flexible and reliable. Moreover, as the tampering records of the content data stored in the SCIDM server are updated after the SCIDM server successfully identifies the content, the SCIDM client may preferentially select a simple identification mechanism (for example, the tampering history-based identification mechanism) when selecting an identification mechanism for the same content. Thus, the load of the content identification system is reduced, and the efficiency of content identification is improved.

In this embodiment, the situation that the SCIDM client sends two content identification requests to the SCIDM server is illustrated. It should be understood that, on the basis of the technical solution according to this embodiment, the SCIDM client may also send three or more content identification requests; for example, the SCIDM client may send a content identification request each time the SCIDM server fails to identify the content, and carry one or more identification mechanisms reselected by the SCIDM client and identification information extracted additionally in the content identification request; and the SCIDM client may not stop sending content identification requests to the SCIDM server, until the SCIDM client receives a content identification success message sent by the SCIDM server, or until the SCIDM client has selected the most complex identification mechanism that the content identification system supports but the SCIDM server still fails to identify the content.

Figure 6:
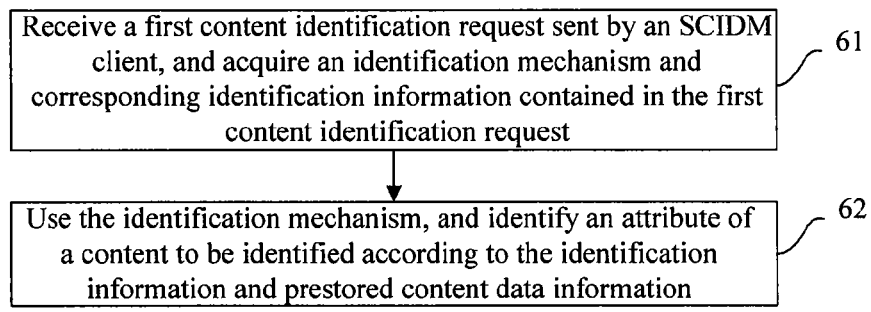
FIG. 6 is a flow chart of an embodiment of another content identification method according to the present invention.

FIG. 6 is a flow chart of an embodiment of another content identification method according to the present invention. Referring to FIG. 6, this embodiment includes the following steps.

In Step 61, an SCIDM server receives a first content identification request sent by an SCIDM client, and acquires an identification mechanism and identification information corresponding to the identification mechanism contained in the first content identification request.

In Step 62, the SCIDM server uses the identification mechanism contained in the first content identification request, and identifies an attribute of a content to be identified according to the identification information contained in the first content identification request and content data information prestored in the SCIDM server.

In this embodiment, the SCIDM server receives the first content identification request sent by the SCIDM client, uses the identification mechanism contained in the first content identification request, and identifies the attribute of the content to be identified according to the identification information contained in the first content identification request, so that the identification mechanism selected by the SCIDM client and identification information can be respectively used as the identification mechanism and identification information for identifying the content to be identified. Thus, the SCIDM client can flexibly select the content identification mechanism according to a load condition of a content identification system or actual security requirements, the load of the content identification system can be reduced, and the efficiency of content identification is improved. In this embodiment, for detailed descriptions with respect to the identification mechanisms and the identification information required by each identification mechanism contained in the first content identification request sent by the SCIDM client, as well as processes that the SCIDM server identifies the content by using the specific identification mechanisms and corresponding identification information, reference may be made to the first to fifth embodiments of the content identification method according to the present invention as well as FIGS. 1-5, and the details will not be described again here.

Figure 7:
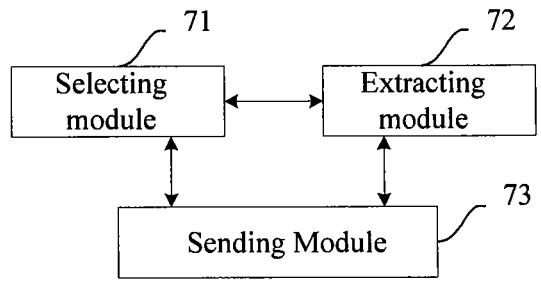
FIG. 7 is a schematic structural view of a first embodiment of an SCIDM client according to the present invention.

FIG. 7 is a schematic structural view of a first embodiment of an SCIDM client according to the present invention. Referring to FIG. 7, this embodiment includes a selecting module 71, an extracting module 72, and a sending module 73.

The selecting module 71 is adapted to select an identification mechanism for a content to be identified.

The extracting module 72 is adapted to extract identification information of the content to be identified corresponding to the identification mechanism selected by the selecting module 71.

The sending module 73 is adapted to send a first content identification request containing the identification mechanism selected by the selecting module 71 and the identification information extracted by the extracting module 72, and is adapted to request an SCIDM server to use the identification mechanism and identify an attribute of the content to be identified according to the identification information.

In this embodiment, the selecting module selects the identification mechanism for the content to be identified, the extracting module extracts the identification information required for the content identification by using the selected identification mechanism from the content to be identified, and the sending module sends the first content identification request containing the identification mechanism and the identification information to the SCIDM server for instructing the SCIDM server to use the identification mechanism contained in the first content identification request and identify the attribute of the content to be identified according to the identification information contained in the first content identification request. Thus, the SCIDM client can flexibly select the content identification mechanism according to a load condition of a content identification system or actual security requirements, the load of a content identification system is reduced, and the efficiency of content identification is improved.

Figure 8:
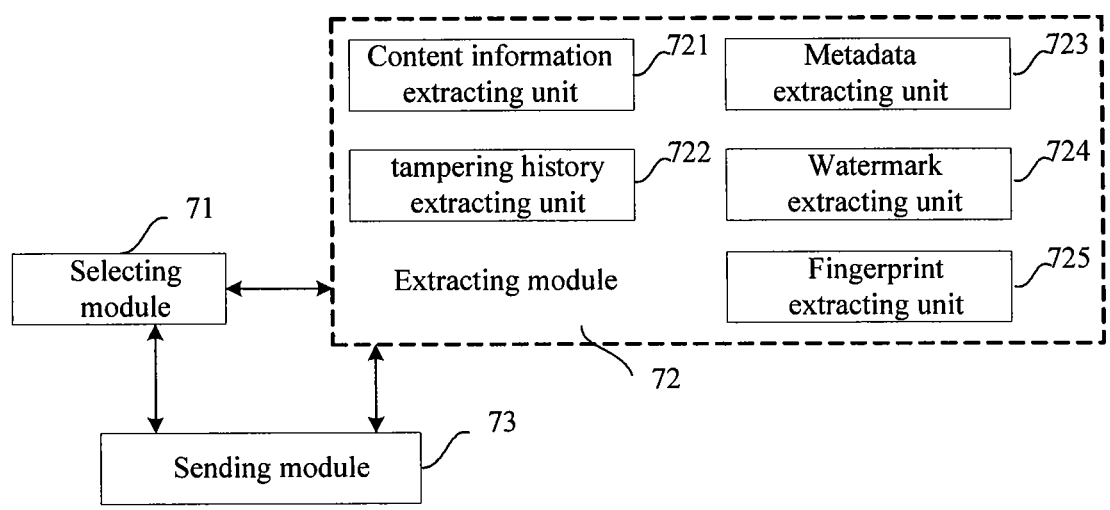
FIG. 8 is a schematic structural view of a second embodiment of the SCIDM client according to the present invention.

FIG. 8 is a schematic structural view of a second embodiment of the SCIDM client according to the present invention. The difference between this embodiment and the first embodiment of the SCIDM client according to the present invention lies in that, in this embodiment, the identification mechanism includes a content ID-based identification mechanism, a tampering history-based identification mechanism, a content metadata-based identification mechanism, a watermark-based identification mechanism, a fingerprint-based identification mechanism, or other identification mechanisms. The identification information includes a content ID, content size information, content source address information, content destination address information, metadata, a digital watermark, or a content fingerprint of the content to be identified, or other identification information required for the content identification by using corresponding identification mechanisms.

The selecting module 71 is further adapted to select the identification mechanism for the content to be identified according to a load condition of a content identification system or preset security requirements. The identification mechanism is the content ID-based identification mechanism, the tampering history-based identification mechanism, the content metadata-based identification mechanism, the watermark-based identification mechanism, or the fingerprint-based identification mechanism.

The extracting module 72 includes at least one of the following units: a content information extracting unit 721, a tampering history extracting unit 722, a metadata extracting unit 723, a watermark extracting unit 724, and a fingerprint extracting unit 725.

The content information extracting unit 721 is adapted to extract the content ID and first auxiliary identification information of the content to be identified when the identification mechanism selected by the selecting module 71 is the content ID-based identification mechanism, in which the first auxiliary identification information includes the content size information.

The tampering history extracting unit 722 is adapted to extract the content ID and second auxiliary identification information of the content to be identified when the identification mechanism selected by the selecting module 71 is the tampering history-based identification mechanism, in which the second auxiliary identification information includes the content source address information or the content destination address information.

The metadata extracting unit 723 is adapted to extract the metadata of the content to be identified when the identification mechanism selected by the selecting module 71 is the content metadata-based identification mechanism.

The watermark extracting unit 724 is adapted to extract the digital watermark in the content to be identified when the identification mechanism selected by the selecting module 71 is the watermark-based identification mechanism.

The fingerprint extracting unit 725 is adapted to extract the content fingerprint of the content to be identified when the identification mechanism selected by the selecting module 71 is the fingerprint-based identification mechanism.

In this embodiment, the selecting module may flexibly select the identification mechanism for the content to be identified according to the load condition of the content identification system or preset security requirements, and the extracting module extracts the identification information required by the identification mechanism according to the identification mechanism selected by the selecting module. Thus, the load of the content identification system is reduced, and the efficiency of content identification is improved.

On the basis of the technical solution according to this embodiment, in order to make the content identification process more reliable, the selecting module 71 may be further adapted to select a new identification mechanism when correct identification instruction information sent by the SCIDM server is received, or select a new identification mechanism when identification failure information sent by the SCIDM server is received and the identification mechanism contained in the first content identification request is not the fingerprint-based identification mechanism. Accordingly, the extracting module 72 is further adapted to additionally extract identification information corresponding to the new identification mechanism; and the sending module 73 is further adapted to send a second content identification request containing the new identification mechanism selected by the selecting module 71 and the identification information additionally extracted by the extracting module 72. Further, if the selecting module 71 selects a plurality of identification mechanisms, the sending module 73 is further adapted to encapsulate the identification mechanisms selected by the selecting module 71 and the identification information corresponding to each of the selected identification mechanisms extracted by the extracting module 72 into the first content identification request, and send the first content identification request to the SCIDM server.

The embodiments of the SCIDM client according to the present invention may be implemented as a separate device, or a functional module integrated in an entity such as a monitor gateway, a user terminal or a content sharing website. For specific methods for implementing content management by using the embodiments of the SCIDM client according to the present invention, reference may be made to the first to fifth embodiments of the content identification method according to the present invention as well as FIGS. 1-5, and the details will not be described again here.

Figure 9:
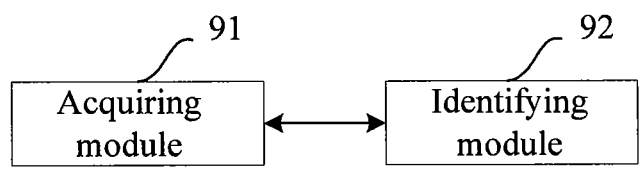
FIG. 9 is a schematic structural view of a first embodiment of an SCIDM server according to the present invention.

FIG. 9 is a schematic structural view of a first embodiment of an SCIDM server according to the present invention. Referring to FIG. 9, this embodiment includes an acquiring module 91 and an identifying module 92.

The acquiring module 91 is adapted to receive a first content identification request sent by an SCIDM client, and acquire an identification mechanism and identification information corresponding to the identification mechanism contained in the first content identification request.

The identifying module 92 is adapted to use the identification mechanism, and identify an attribute of a content to be identified according to the identification information and pre-stored content data information.

In this embodiment, the acquiring module acquires the identification mechanism and identification information contained in the first content identification request sent by the SCIDM client, and the identifying module uses the acquired identification mechanism and identification information to identify the attribute of the content to be identified, so that the identification mechanism selected by the SCIDM client and identification information can be respectively used by the identifying module as the identification mechanism and identification information for identifying the content to be identified. Thus, the SCIDM client can flexibly select the content identification mechanism according to a load condition of a content identification system or actual security requirements, the load of the content identification system can be reduced, and the efficiency of content identification is improved.

Figure 10:
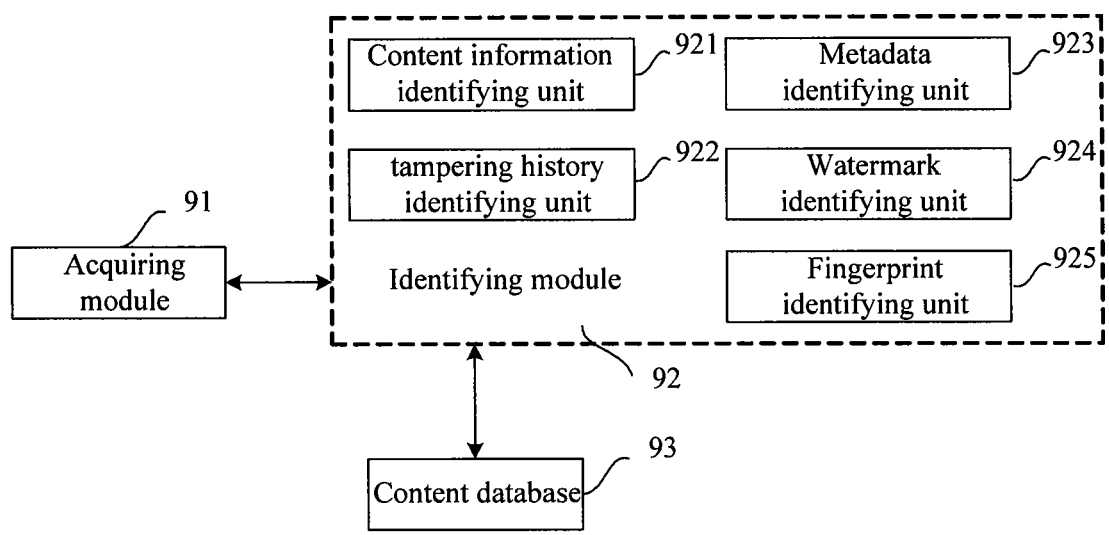
FIG. 10 is a schematic structural view of a second embodiment of the SCIDM server according to the present invention.

FIG. 10 is a schematic structural view of a second embodiment of the SCIDM server according to the present invention. The difference between this embodiment and the first embodiment of the SCIDM server according to the present invention lies in that, this embodiment further includes a content database 93, and the identifying module 92 includes at least one of the following units: a content information identifying unit 921, a tampering history identifying unit 922, a metadata identifying unit 923, a watermark identifying unit 924, and a fingerprint identifying unit 925.

The content database 93 is adapted to store the content data information. The content data information may include actual attribute information, tampering records, actual watermark information, actual metadata, protected content fingerprints, or other information of a content. The actual attribute information may include the actual content ID and actual content size information. The tampering records may include the tampered content ID, content identification time information, content source address information, content destination address information, and the like.

In the identifying module 92, the content information identifying unit 921 is adapted to query whether an actual content ID matching the content ID exists in the actual attribute information stored in a content database or not according to the content ID when the acquired identification mechanism is a content ID-based identification mechanism and the acquired identification information includes a content ID and first auxiliary identification information of the content to be identified,, adapted to compare whether the first auxiliary identification information corresponding to the stored actual content ID matches corresponding information contained in the identification information or not if the actual content ID matching the content ID exists in the actual attribute information stored in a content database or not according to the content ID,; adapted to send a content identification success message if the first auxiliary identification information corresponding to the stored actual content ID matches corresponding information contained in the identification information. Here, the first auxiliary identification information includes the content size information.

The tampering history identifying unit 922 is adapted to query whether a tampered content ID matching the content ID exists in the stored tampering records or not according to the content ID when the acquired identification mechanism is a tampering history-based identification mechanism, and the acquired identification information includes the content ID and second auxiliary identification information of the content to be identified, adapted to acquire an actual content ID corresponding to the tampered content ID if the tampered content ID matching the content ID exists in the tampering records and the second auxiliary identification information matches corresponding information in the tampering records, and adapted to query the actual attribute information stored in the SCIDM server according to the actual content ID. Here, the second auxiliary identification information includes the content source address information or the content destination address information.

The metadata identifying unit 923 is adapted to query whether actual metadata matching the metadata exists in the actual metadata stored in the content database or not according to the metadata when the identification mechanism acquired by the acquiring module is a content metadata-based identification mechanism, and the acquired identification information includes metadata of the content to be identified, and adapted to send a content identification success message if the actual metadata matching the metadata exists in the actual metadata stored in the content database.

The watermark identifying unit 924 is adapted to query whether actual watermark information matching the digital watermark exists in the actual watermark information stored in the content database or not according to the digital watermark when the identification mechanism acquired by the acquiring module is a watermark-based identification mechanism and the acquired identification information includes a digital watermark in the content to be identified, and adapted to send a content identification success message if the actual watermark information matching the digital watermark exists in the actual watermark information stored in the content database.

The fingerprint identifying unit 925 is adapted to query whether a protected content fingerprint matching the content fingerprint of the content to be identified exists in the stored protected content fingerprints or not according to the content fingerprint when the identification mechanism acquired by the acquiring module is a fingerprint-based identification mechanism, and the acquired identification information includes a content fingerprint of the content to be identified, and adapted to send a content identification success message if the protected content fingerprint matching the content fingerprint of the content to be identified exists in the stored protected content fingerprints.

In this embodiment, the acquiring module may acquire the identification mechanism selected by the SCIDM client and identification information according to the first content identification request sent by the SCIDM client, and the identifying module identifies the content according to the specific identification mechanism and identification information as well as the content data information stored in the content database. Thus, the SCIDM client can flexibly select the content identification mechanism according to the load condition of the content identification system or preset security requirements, the load of the content identification system is reduced, and the efficiency of content identification is improved.

On the basis of the technical solution according to this embodiment, in order to improve the accuracy and reliability of content identification, the identifying module may further include an identification instruction information sending unit. The identification instruction information sending unit is adapted to send correct identification instruction information to the SCIDM client for instructing the SCIDM client to additionally provide a content fingerprint corresponding to the content to be identified when the acquired identification mechanism is the content ID-based identification mechanism, the tampering history-based identification mechanism, the content metadata-based identification mechanism or the watermark-based identification mechanism, and the content identification fails. If the SCIDM client receives a content identification failure message sent by the SCIDM server and actively selects a new identification mechanism and additionally extracts the required identification information, the identifying module 92 is further adapted to receive a second content identification request sent by the SCIDM client containing a new identification mechanism and additionally provided identification information, use the new identification mechanism, and identify the attribute of the content to be identified according to the additionally provided identification information.

Further, in order to improve the subsequent identification efficiency of the same content, on the basis of the technical solution according to this embodiment, the SCIDM server may further include an update module. The update module is adapted to update or store a tampering record corresponding to the content to be identified according to the actual content ID, tampered content ID, content source address information, content destination address information, or content identification time information of the content to be identified when the identification mechanism acquired by the acquiring module is the content metadata-based identification mechanism, the watermark-based identification mechanism or the fingerprint-based identification mechanism, and the identifying module successfully identifies the content. If the first content identification request sent by the SCIDM client to the SCIDM server contains a plurality of identification mechanisms, the identifying module is further adapted to identify the attribute of the content to be identified by using corresponding identification mechanisms in turn according to a preset execution order of the identification mechanisms when the received first content identification request contains a plurality of identification mechanisms.

For specific methods for implementing content management by using the embodiments of the SCIDM server according to the present invention, reference may be made to the embodiment of the other content identification method according to the present invention as well as FIG. 6, and the details will not be described again here.

Figure 11:
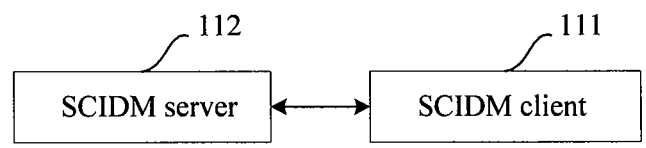
FIG. 11 is a schematic structural view of an embodiment of a content identification system according to the present invention.

FIG. 11 is a schematic structural view of an embodiment of a content identification system according to the present invention. Referring to FIG. 11, this embodiment includes an SCIDM client 111 and an SCIDM server 112.

The SCIDM client 111 is adapted to select an identification mechanism for a content to be identified, extract identification information of the content to be identified corresponding to the selected identification mechanism, and send a first content identification request, in which the first content identification request contains the selected identification mechanism and the identification information.

The SCIDM server 112 is adapted to receive the first content identification request sent by the SCIDM client, acquire the identification mechanism and the identification information corresponding to the identification mechanism contained in the first content identification request, use the identification mechanism, and identify an attribute of the content to be identified according to the identification information and prestored content data information.

In this embodiment, the SCIDM client selects the identification mechanism for the content to be identified, extracts the identification information required for the content identification by using the selected identification mechanism from the content to be identified, and sends the first content identification request containing the identification mechanism and the identification information to the SCIDM server; and the SCIDM server uses the identification mechanism contained in the first content identification request and identifies the attribute of the content to be identified according to the identification information contained in the first content identification request. Thus, the SCIDM client can flexibly select the content identification mechanism according to a load condition of a content identification system or actual security requirements, the load of a content identification system is reduced, and the efficiency of content identification is improved.

In the content identification system of the present invention, for detailed functional modules of the SCIDM client, reference may be made to the embodiments of the SCIDM client according to the present invention as well as FIGS. 7-8; for detailed functional modules of the SCIDM server, reference may be made to the embodiments of the SCIDM server according to the present invention as well as FIGS. 9-10, and the details will not be described again here.

It should be understood by those skilled in the art that the accompanying drawings are merely schematic views of preferred embodiments, and modules or processes in the accompanying drawings are not necessarily required for implementing the present invention.

It should be understood by those skilled in the art that, modules in the devices according to the embodiments may be distributed in the devices of the embodiments according to the description of the embodiments, or be correspondingly changed and disposed in one or more devices different from the embodiments. The modules of the above embodiments may be combined into one module, or further divided into a plurality of sub-modules.

The sequence numbers of the above embodiments of the present invention are merely for the convenience of description, and do not imply the preference among the embodiments.

Those of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a read-only memory (ROM), a random access memory (RAM), a magnetic disk, and an optical disk.

Finally, it should be noted that the above embodiments are merely provided for describing the technical solutions of the present invention, but are not intended to limit the present invention. It should be understood by those of ordinary skill in the art that although the present invention is described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the present invention.

What is claimed is:

1. A content identification method, comprising:
    selecting, by a secure content identification mechanism (SCIDM) client, a first identification mechanism for a content to be identified;
    extracting first identification information of the content corresponding to the first identification mechanism selected by the SCIDM client;
    sending a first content identification request by the SCIDM client, wherein the first content identification request comprises the first identification mechanism and the first identification information, and wherein the first content identification request requests an SCIDM server to search content data stored in the SCIDM server for the first identification information by using the first identification mechanism and to send an attribute of the content when the SCIDM server determines that the first identification information matches the content data stored in the SCIDM server; and
    when the SCIDM server determines that the first identification information does not match the content data stored in the SCIDM server, selecting, by the SCIDM client, a second identification mechanism for the content to be identified, extracting second identification information of the content corresponding to the second identification mechanism, and sending the second identification mechanism and the second identification information to the SCIDM server to request the SCIDM server to search the content data stored in the SCIDM server for the second identification information by using the second identification mechanism,
    wherein selecting the first identification mechanism or selecting the second identification mechanism comprises selecting the identification mechanism for the content to be identified based at least in part on a load condition of a content identification system,
    wherein a simple content identification mechanism is selected when the content identification system is under a low load, and
    wherein a complex content identification mechanism is selected when the content identification system is under a high load.

2. The content identification method according to claim 1, wherein the first identification mechanism comprises a content ID-based identification mechanism, a tampering history-based identification mechanism, a content metadata-based identification mechanism, a watermark-based identification mechanism, or a fingerprint-based identification mechanism, and wherein the first identification information comprises a content ID, content size information, content source address information, content destination address information, metadata, a digital watermark, or a content fingerprint of the content to be identified.

3. The content identification method according to claim 2, wherein extracting the first identification information of the content corresponding to the first identification mechanism comprises:
   extracting the content ID and first auxiliary identification information of the content when the first identification mechanism is the content ID-based identification mechanism, wherein the first auxiliary identification information comprises the content size information;
   extracting the content ID and second auxiliary identification information of the content when the first identification mechanism is the tampering history-based identification mechanism, wherein the second auxiliary identification information comprises the content source address information or the content destination address information;
   extracting the metadata of the content when the first identification mechanism is the content metadata-based identification mechanism;
   extracting the digital watermark in the content when the first identification mechanism is the watermark-based identification mechanism; and
   extracting the content fingerprint of the content when the first identification mechanism is the fingerprint-based identification mechanism.

4. The content identification method according to claim 1, wherein the second identification mechanism is selected when correct identification instruction information sent by the SCIDM server is received, or when identification failure information sent by the SCIDM server is received and the first identification mechanism comprised in the first content identification request is not a fingerprint-based identification mechanism.

5. The content identification method according to claim 1, wherein selecting the first identification mechanism or selecting the second identification mechanism comprises selecting the identification mechanism for the content to be identified based at least in part on a specific application scenario, or preset security requirements.

6. A secure content identification mechanism (SCIDM) client, comprising:
   a processor; and
   a computer-readable medium for storing program codes, which, when executed by the processor, cause the processor to:
   select a first identification mechanism for a content to be identified;
   extract first identification information of the content to be identified corresponding to the first identification mechanism;
   send a first content identification request, wherein the first content identification request comprises the first identification mechanism and the first identification information, and wherein the first content identification request requests an SCIDM server to search content data stored in the SCIDM server for the first identification information by using the first identification mechanism and send an attribute of the content when the SCIDM server determines that the first identification information matches the content data stored in the SCIDM server; and
   when the SCIDM server determines that the first identification information does not match the content data stored in the SCIDM server, select a second identification mechanism for the content to be identified, extract second identification information of the content corresponding to the second identification mechanism, and send the second identification mechanism and the second identification information to the SCIDM server to request the SCIDM server to search the content data stored in the SCIDM server for the second identification information by using the second identification mechanism,
   wherein the first identification mechanism or the second identification mechanism is selected based at least in part on a load condition of a content identification system,
   wherein a simple content identification mechanism is selected when the content identification system is under a low load, and
   wherein a complex content identification mechanism is selected when the content identification system is under a high load.

7. The SCIDM client according to claim 6, wherein the first identification mechanism comprises a content ID-based identification mechanism, a tampering history-based identification mechanism, a content metadata-based identification mechanism, a watermark-based identification mechanism, or a fingerprint-based identification mechanism, wherein the first identification information comprises a content ID, content size information, metadata, a digital watermark or a content fingerprint of the content to be identified, and wherein the program codes further cause the processor to:
   extract the content ID and first auxiliary identification information of the content when the first identification mechanism selected by the selecting device is the content ID-based identification mechanism, wherein the first auxiliary identification information comprises the content size information;
   extract the content ID and second auxiliary identification information of the content when the first identification mechanism selected by the selecting device is the tampering history-based identification mechanism, wherein the second auxiliary identification information comprises the content source address information or the content destination address information;
   extract the metadata of the content when the first identification mechanism selected by the selecting device is the content metadata-based identification mechanism;
   extract the digital watermark in the content when the first identification mechanism selected by the selecting device is the watermark-based identification mechanism; and
   extract the content fingerprint of the content when the first identification mechanism selected by the selecting device is the fingerprint-based identification mechanism.

8. The SCIDM client according to claim 7, wherein the program codes further cause the processor to select the second identification mechanism when correct identification instruction information sent by the SCIDM server is received, or when identification failure information sent by the SCIDM server is received and the identification mechanism comprised in the first content identification request is not the fingerprint-based identification mechanism.

9. A secure content identification mechanism (SCIDM) server, comprising:
a processor; and
a computer-readable medium for storing program codes, which, when executed by the processor, cause the processor to:
receive a first content identification request comprising a plurality of identification mechanisms sent by an SCIDM client;
acquire a first identification mechanism, first identification information corresponding to the first identification mechanism, a second identification mechanism, and second identification information corresponding to the second identification mechanism comprised in the first content identification request;
search content data stored in the SCIDM server for the first identification information by using the first identification mechanism;
send an attribute of the content when the SCIDM server determines that the first identification information matches the content data stored in the SCIDM server; and
search the content data stored in the SCIDM for the second identification information by using the second identification mechanism when the SCIDM server determines that the first identification information does not match the content data stored in the SCIDM server,
wherein the first identification mechanism or the second identification mechanism is selected based at least in part on a load condition of a content identification system,
wherein a simple content identification mechanism is selected when the content identification system is under a low load, and
wherein a complex content identification mechanism is selected when the content identification system is under a high load.

10. The SCIDM server according to claim 9, wherein the program codes further cause the processor to store the content data information in a content database, wherein the content data information comprises actual attribute information, tampering records, actual watermark information, actual metadata, or protected content fingerprints of the content, wherein the actual attribute information comprises an actual content ID and actual content size information, and wherein the tampering records comprise a tampered content ID, content identification time information, content source address information, and content destination address information.

11. The SCIDM server according to claim 10, wherein the program codes further cause the processor to:
when the acquired first identification mechanism is a content ID-based identification mechanism and the acquired first identification information comprises a content ID and first auxiliary identification information of the content to be identified, query whether the actual content ID matching the content ID exists in the actual attribute information according to the content ID;
compare whether the first auxiliary identification information corresponding to the stored actual content ID matches corresponding information comprised in the first identification information if the actual content ID matching the content ID exists in the actual attribute information;
send a content identification success message if the first auxiliary identification information corresponding to the stored actual content ID matches corresponding information contained in the first identification information, wherein the first auxiliary identification information comprises the content size information;
when the acquired identification mechanism is a tampering history-based identification mechanism and the acquired first identification information comprises the content ID and second auxiliary identification information of the content to be identified, query whether the tampered content ID matching the content ID exists in the stored tampering records according to the content ID;
acquire an actual content ID corresponding to the tampered content ID if the tampered content ID matching the content ID exists in the tampering records and the second auxiliary identification information matches corresponding information in the tampering records;
query the actual attribute information stored in the SCIDM server according to the actual content ID, wherein the second auxiliary identification information comprises the content source address information or the content destination address information;
when the identification mechanism acquired by the acquiring device is a content metadata-based identification mechanism and the acquired first identification information comprises metadata of the content to be identified, query whether actual metadata matching the metadata exists in the actual metadata according to the metadata;
send a content identification success message if the actual metadata matching the metadata exists in the actual metadata stored in the content database;
when the identification mechanism acquired by the acquiring device is a watermark-based identification mechanism and the acquired first identification information comprises a digital watermark in the content to be identified, query whether actual watermark information matching the digital watermark exists in the actual watermark information according to the digital watermark;
send a content identification success message if the actual watermark information matching the digital watermark exists in the actual watermark information stored in the content database;
when the identification mechanism acquired by the acquiring device is a fingerprint-based identification mechanism, and the acquired first identification information comprises a content fingerprint of the content to be identified, query whether a protected content fingerprint matching the content fingerprint of the content to be identified exists in the stored protected content fingerprints according to the content fingerprint; and
send a content identification success message if the protected content fingerprint matching the content fingerprint of the content exists in the stored protected content fingerprints.

12. The SCIDM server according to claim 11, wherein the program codes further cause the processor to send correct identification instruction information to the SCIDM client for instructing the SCIDM client to additionally provide a content fingerprint corresponding to the content when the acquired first identification mechanism is the content ID-based identification mechanism, the tampering history-based identification mechanism, the content metadata-based identification mechanism, or the watermark-based identification mechanism, and when the content identification fails.

13. The SCIDM server according to claim 12, wherein the program codes further cause the processor to receive a second content identification request comprising the second identification mechanism and the second identification information sent by the SCIDM client.

14. The SCIDM server according to claim 13, wherein the program codes further causes the processor to update or store a tampering record corresponding to the content to be identified according to the actual content ID, the tampered content ID, the content source address information, the content destination address information, or the content identification time information of the content to be identified when the first identification mechanism or the second identification mechanism acquired by the acquiring device is the content metadata-based identification mechanism, the watermark-based identification mechanism, or the fingerprint-based identification mechanism, and when the content is successfully identified.

15. A content identification method, comprising:
selecting, by a secure content identification mechanism (SCIDM) client, a first identification mechanism and a second identification mechanism for a content to be identified;
extracting first identification information of the content corresponding to the first identification mechanism and second identification information of the content corresponding to the second identification mechanism selected by the SCIDM client; and
sending a content identification request by the SCIDM client, wherein the content identification request comprises the first identification mechanism, the first identification information, the second identification mechanism, and the second identification information, and wherein the content identification request requests an SCIDM server to search content data stored in the SCIDM server for the first identification information by using the first identification mechanism, send an attribute of the content when the SCIDM server determines that the first identification information matches the content data stored in the SCIDM server, and search the content data in the SCIDM server for the second identification information by using the second identification mechanism when the SCIDM server determines that the first identification information does not match the content data stored in the SCIDM server,
wherein selecting the first identification mechanism or selecting the second identification mechanism comprises selecting the identification mechanism for the content to be identified based at least in part on a load condition of a content identification system,
wherein a simple content identification mechanism is selected when the content identification system is under a low load, and
wherein a complex content identification mechanism is selected when the content identification system is under a high load.

16. The content identification method according to claim 15, wherein selecting the first identification mechanism and the second identification mechanism comprises selecting the first identification mechanism and the second identification mechanism for the content to be identified according to a specific application scenario or preset security requirements.

17. A secure content identification mechanism (SCIDM) client, comprising:
a processor; and
a computer-readable medium for storing program codes, which, when executed by the processor, cause the processor to:
select a first identification mechanism and a second identification mechanism for a content to be identified;
extract first identification information of the content corresponding to the first identification mechanism and second identification information of the content corresponding to the second identification mechanism; and
send a content identification request, wherein the content identification request comprises the first identification mechanism, the first identification information, the second identification mechanism, and the second identification information, and wherein the content identification request requests an SCIDM server to search content data stored in the SCIDM server for the first identification information by using the first identification mechanism, send an attribute of the content when the SCIDM server determines that the first identification information matches the content data stored in the SCIDM server, and search the content data stored in the SCIDM server for the second identification information by using the second identification mechanism when the SCIDM server determines that the first identification information does not match the content data stored in the SCIDM server,
wherein the first identification mechanism or the second identification mechanism is selected based at least in part on a load condition of a content identification system,
wherein a simple content identification mechanism is selected when the content identification system is under a low load, and
wherein a complex content identification mechanism is selected when the content identification system is under a high load.

* * * * *